United States Patent
Kishino et al.

[11] 3,876,782
[45] Apr. 8, 1975

[54] O-(METHYLCYCLOHEXYL)-S-METHYL-O(2-CYANOPHENYL) THIOLPHOSPHATE FUNGICIDAL AND BACTERICIDAL AGENTS

[75] Inventors: Shigeo Kishino; Yasuo Yamada; Yoshio Kurahashi; Toyohiko Kume, all of Tokyo, Japan

[73] Assignee: Bayer Aktiengesellschaft, Leverkusen, Germany

[22] Filed: Aug. 27, 1973

[21] Appl. No.: 392,142

Related U.S. Application Data

[62] Division of Ser. No. 296,698, July 7, 1972, Pat. No. 3,786,117.

[30] Foreign Application Priority Data
July 16, 1971  Japan................ 46-52394

[52] U.S. Cl. ................................. 424/210
[51] Int. Cl............................... A01n 9/20
[58] Field of Search................ 424/210; 260/940

[56] References Cited
UNITED STATES PATENTS
3,444,274  5/1969  Schrader................ 260/940 X
3,786,117  1/1974  Kishino................ 260/940

*Primary Examiner*—Albert T. Meyers
*Assistant Examiner*—Leonard Schenkman
*Attorney, Agent, or Firm*—Burgess, Dinklage & Sprung

[57] ABSTRACT

O-(methylcyclohexyl)-S-methyl-O-(2-cyanophenyl)-thiolphosphates of the general formula

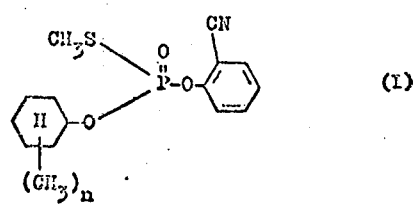

in which
  $n$ is 1 or 2, which possess fungicidal and bactericidal properties.

9 Claims, No Drawings

O-(METHYLCYCLOHEXYL)-S-METHYL-O(2-CYANOPHENYL) THIOLPHOSPHATE FUNGICIDAL AND BACTERICIDAL AGENTS

This is a division of application Ser. No. 296,698, filed July 7, 1972, now U.S. Pat. No. 3,786,117.

The present invention relates to and has for its objects the provision of particular new O-(methylcyclohexyl)-S-methyl-O-(2-cyanophenyl) thiolphosphates, i.e., O-(mono- or di-methylcyclohexyl)-S-methyl-O-(2-cyanophenyl)thiolphosphates, which possess fungicidal and bactericidal properties, active compositions in the form of mixtures of such compounds with solid and liquid dispersible carrier vehicles, and methods for producing such compounds and for using such compounds in a new way especially for combating pests, e.g., fungi and bacteria, with other and further objects becoming apparent from a study of the within specification and accompanying examples.

Because of their excellent fungicidal activity and for reasons of economy, compounds containing heavy metals have been used in the past for controlling fungi that cause diseases, such as blast and sheath blight, that are fatal to rice plants. However, owing to their direct and indirect toxicities, the use of these compounds has been widely restricted and various organic phosphorus compounds have been developed as substitutes therefor. For instance, O-ethyl-S,S-diphenylphosphorodithiolate (tradename "Hinosan") and O,O-diisopropyl-S-benzylthiophosphate (tradename "Kitazin-P") are now marketed.

The present invention provides, as new compounds, the thiophosphoric acid esters of the general formula

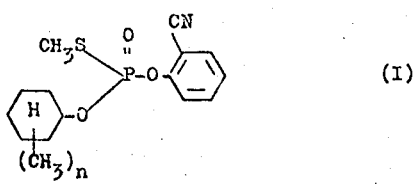

in which
$n$ is 1 or 2.

The compounds of the above formula have been found to exhibit high fungicidal and bactericidal activities, particularly against fungi and bacteria causing diseases in plants; the compounds also possess an excellent growth-inhibiting activity with regard to such fungi and bacteria. Accordingly, the active compounds can be used for controlling plant-disease-causing fungi and bacteria within a broad range.

Compared with active compounds of similar structures which have been described in the literature or known compounds exhibiting similar activities, the novel compounds of this invention are characterized by substantially improved effects and only a low toxicity to warm-blooded animals. Accordingly, the compounds of this invention are of great utility.

The present invention also provides a process for the preparation of a compound of this invention, in which 2-cyanophenol of the formula

is reacted, in the presence of an acid-binding agent or in the form of a metal salt thereof, with a thiolphosphoric acid ester chloride of the general formula

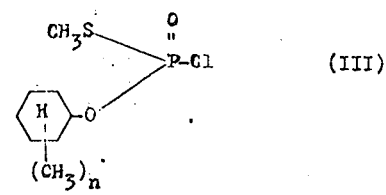

in which
$n$ is 1 or 2.

As examples of the thiolphosphoric acid ester chlorides of the formula (III), there may be mentioned S-methyl-O-(2-methylcyclohexyl)-thiolphosphoric acid ester chloride, S-methyl-O-(3-methylcyclohexyl)-thiolphosphoric acid ester chloride, S-methyl-O-(4-methylcyclohexyl)-thiolphosphoric acid ester chloride, S-methyl-O-(2,5-dimethylcyclohexyl)-thiolphosphoric acid ester chloride, S-methyl-O-(3,5-dimethylcyclohexyl)-thiolphosphoric acid ester chloride and S-methyl-O-(3,4-dimethylcyclohexyl)-thiolphosphoric acid ester chloride.

It is preferred that the reaction in the above process be conducted in the presence of a solvent or diluent. For this purpose any inert solvent or diluent may be used, especially water; an aliphatic, alicyclic or aromatic hydrocarbon (which may be chlorinated) such as hexane, cyclohexane, petroleum ether, ligroin, benzene, toluene, xylene, methylene chloride, chloroform, carbon tetrachloride or mono-, di- or tri-chloroethylene; an ether such as diethyl ether, methyl ethyl ether, diisopropyl ether, dibutyl ether, ethylene oxide, dioxane or tetrahydrofuran; a ketone such as acetone, methyl ethyl ketone, methyl isobutyl ketone or methyl isopropyl ketone; a nitrile such as acetonitrile, propionitrile or acrylonitrile; an alcohol such as methanol, ethanol, isopropanol, butanol or ethylene glycol; an ester such as ethyl acetate or amyl acetate; an acid amide such as dimethyl acetamide; a sulfoxide or sulfone such as dimethyl sulfoxide or sulfolane; or a base such as pyridine.

The reaction may be effected using an acid-binding agent. For this purpose, there may be used any customary acid-binder such as an alkali metal hydroxide, carbonate, bicarbonate or alcoholate, or a tertiary amine, for example triethylamine, diethylaniline or pyridine.

When the reaction is effected in the absence of such an acid-binder, the intended product of a high purity can be obtained in a high yield by reacting a salt of 2-cyanophenol, preferably an alkali metal salt of 2-cyanophenol, with the thiolphosphoric acid ester chloride.

The reaction may be effected at temperatures within a fairly broad range; generally, the reaction is carried out at about −20°C to the boiling point of the reaction mixture, preferably about 0° to 100°C or to the boiling point of the reaction mixture, whichever is the lower.

The reaction is preferably conducted under atmospheric pressure, although it is possible to conduct the reaction under reduced or elevated pressure.

The reaction used in the process of this invention may be represented by the following equation:

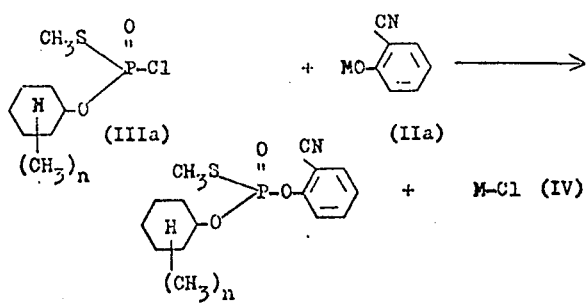

in which
 $n$ is 1 or 2, and
 M is a hydrogen or metal atom.

Surprisingly, the compounds of the formula (I) have fungicidal activities that are comparable or superior to those of Hinosan and Kitazin-P mentioned above.

The compounds of this invention can be used effectively as agents for protecting plants from damage caused by *Archimycetes, Phycomycetes, Ascomycetes, Basidiomycetes, Fungi Imperfecti* and other fungi, as well as bacteria.

In particular, the compounds of this invention give good results in controlling pathogenic bacteria and fungi causing disease in rice plants, fruit trees and vegetables, especially in controlling fungi causing diseases in rice plants, such as *Piricularia oryzae*, which causes blast, *Pellicularia sasakii*, which causes sheath blith, *Cochliobolus miyabeanus*, which causes brown spot, *Helminthosporium sigmoideum*, which causes stem-rot, and *Sphaerulina oryzina*, which causes cercospora leaf spot. Accordingly, they may often be used for controlling two or more of these pathogenic organisms at the same time. Surprisingly, these compounds show not only curative effects but also preventive effects with excellent durability of these effects; hence their suitability for the concurrent control of these organisms is enhanced.

Furthermore, the compounds of this invention can be applied for controlling pathogenic bacteria and fungi living in the above-ground portions of plants, pathogenic bacteria and fungi attacking plants from the soil and causing tracheomycoses, seed-infecting pathogenic bacteria and fungi and soil-infecting pathogenic bacteria and fungi.

By virtue of the above-mentioned excellent fungicidal and bactericidal characteristics, the compounds of this invention can be used very conveniently as agricultural and horticultural agents for controlling bacteria and fungi causing diseases in plants, and are valuable for saving labor in agriculture.

Moreover, since the compounds of this invention do not contain any harmful heavy metal such as mercury or arsenic, they do not bring about a problem of residual toxicity in crops and have only a very low toxicity towards warm-blooded animals, fish and shellfish. Thus, the compounds of this invention have great advantages when applied as agricultural chemicals.

The active compounds according to the instant invention can be utilized, if desired, in the form of the usual formulations or compositions with conventional inert (i.e., plant compatible or herbicidally inert) pesticide diluents or extenders, i.e., diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g., benzene, toluene, xylene, alkyl naphthalenes, etc.), halogenated, especially chlorinated, aromatic hydrocarbons (e.g., chlorobenzenes, etc.), cycloalkanes (e.g., cyclohexane, etc.), paraffins (e.g., petroleum or mineral oil fractions), chlorinated aliphatic hydrocarbons (e.g., methylene chloride, chloroethylenes, etc.), alcohols (e.g., methanol, ethanol, propanol, butanol, glycol, etc.) as well as ethers and esters thereof (e.g., glycol monomethyl ether, etc.), amines (e.g., ethanolamine, etc.), amides (e.g., dimethyl formamide, etc.), sulfoxides (e.g., dimethyl sulfoxide, etc.), acetonitrile, ketones (e.g., acetone, methyl ethyl ketone, methyl isobutyl ketone, cyclohexanone, etc.), and/or water; as well as inert dispersible finely divided solid carriers, such as ground natural minerals (e.g., kaolins, clays, alumina, silica, chalk, i.e., calcium carbonate, talc, attapulgite, montmorillonite, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Possible adjuvants include organic matter, stabilizers, adhesive agents, for example soap, calcium caseinate, sodium alginate, polyvinyl alcohol, steeping agents, coumarone (or indene) resins or polyvinyl butyl ether, combustible materials (for fumigants), for example nitrites, zinc dust or dicyandiamide, oxygen-yielding substances, for example perchlorates or dichromates, phytotoxicity-reducing substances, for example zinc sulfate, ferrous chloride or copper nitrate, substances for prolonging the biological effect, for example chlorinated terphenyls, emulsion-stabilizing substances, for example casein, gum tragacanth and carboxymethyl cellulose (polyvinyl alcohol also being suitable for this purpose), and synergistic agents.

The compounds of the present invention can, if desired, be applied with other agricultural chemicals such as insecticides, acaricides, nematocides, antiviral agents, herbicides, plant-growth regulators and attractants (which classes of stances include phosphoric acid esters, carbamates, dithio-(or thiol-) carbamates, chlorinated organic compounds, dinitro compounds, organosulfur or organometallic compounds, anitbiotics, substituted diphenyl ethers, ureas and triazine compounds) as well as with fertilizers.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–20%, preferably 0.005–10%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001–95%, and preferably 0.005–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 3 to 1,000 g/hectare, preferably 30 to 600 g/hectare, are sufficient. In this process it is possible to use highly concentrated liquid compositions with said liquid carrier vehicles containing from about 20 to about 95% by weight of the active compound or even the 100% active substance alone, e.g., about 20–100% by weight of the active compound.

Furthermore, the present invention contemplates methods of selectively killing, combating or controlling pests, e.g., fungi and bacteria, which comprises applying to at least one of correspondingly (a) such fungi, (b) such bacteria, and (c) the corresponding habitat thereof, i.e., the locus to be protected such as soil, seeds or plants, a correspondingly combative or toxic amount, i.e., a fungicidally or bactericidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

11.9 g of 2-cyanophenol and 10.1 g of triethylamine are dissolved in 200 ml of benzene, and 24.3 g of O-(3-methylcyclohexyl)-S-methylthiolphosphoric acid ester chloride are added dropwise to the solution at 5°–10°C with agitation. After completion of the dropwise addition, the reaction mixture is agitated at 50° – 55°C for 3 hours to complete the reaction. The reaction product is washed with water, 1% hydrochloric acid, a 2% aqueous solution of sodium carbonate and then with water again, and dried over anhydrous sodium sulfate. Distillation of benzene gives 30 g of O-(3-methylcyclohexyl)-S-methyl-O-(2-cyanophenyl)thiolphosphate having a refractive index $n_D^{20}$ of 1.5402. The product (which is hereinafter referred to as compound No. 2) has the following formula:

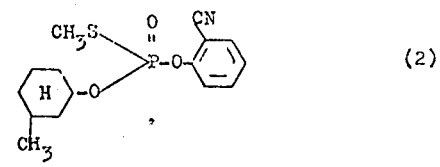

EXAMPLE 2

The general procedure described above in Example 1 is repeated, but employing the following reactants:

| | |
|---|---|
| 2-cyanophenol | 11.9 g |
| triethylamine | 10.1 g |
| 0-(3,5-dimethylcyclohexyl)-S-methyl-thiolphosphoric acid ester chloride | 25.7 g |
| benzene (solvent) | 200 ml |

There are obtained 31 g of O-(3,5-dimethylcyclohexyl)-S-methyl-O-(2-cyanophenyl)thiolphosphate having a refractive index $n_D^{20}$ of 1.5381. The product (which is hereinafter referred to as compound No. 5) has the following formula:

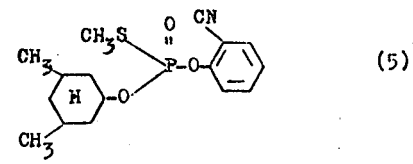

Compounds of this invention prepared by a method similar to that described above are shown in the following Table.

Table 1

| Compound No. | Structural Formula | Refractive Index $n_D^{20}$ |
|---|---|---|
| 1 | CH₃S–P(=O)–O–C₆H₄–CN with cyclohexyl-H-O– and CH₃ substituent | 1.5461 |
| 3 | CH₃S–P(=O)–O–C₆H₄–CN with CH₃-cyclohexyl-H-O– | 1.5402 |
| 4 | CH₃S–P(=O)–O–C₆H₄–CN with CH₃, cyclohexyl-H-O–, CH₃ | 1.5379 |
| 6 | CH₃S–P(=O)–O–C₆H₄–CN with CH₃, CH₃-cyclohexyl-H-O–, CH₃ | 1.5359 |

The compositions of this invention are illustrated in and by the following Examples, in which the active compounds are identified by the numbers assigned to them in Examples 1 and 2 and Table 1.

EXAMPLE 3

(Wettable Powder)

15 parts of compound No.1, 80 parts of a 1:5 mixture of diatomaceous earth and kaolin and 5 parts of an emulsifier, "Runnox" (a polyoxyethylene alkyl aryl ether) were ground and mixed together to from a wettable powder. It was diluted with water to a concentration of 0.05% before being applied.

EXAMPLE 4

(Emulsifiable Liquor)

30 parts of compound of No.2, 30 parts of xylene, 30 parts of "Kawakazol" (high-boiling-point aromatic hydrocarbons), and 10 parts of an emulsifier "Sorpol" (a polyoxyethylene alkyl aryl ether) were mixed by stirring to form an emulsifiable liquor. It was diluted with water to 0.05% before being applied.

EXAMPLE 5

(Dust)

2 parts of compound No. 5 and 98 parts of a 1:3 mixture of talc and clay were ground and mixed together to form a dust.

EXAMPLE 6

(Dust)

1.5 parts of compound No. 2, 2 parts of an organic phosphoric acid ester, 0.5 parts of isopropyl hydrogen phosphate and 96 parts of a 1:3 mixture of talc and clay were ground and mixed together to form a dust. The dust was applied by scattering.

EXAMPLE 7

(Granules)

25 parts of water were added to a mixture of 10 parts of compound No. 3, 10 parts of bentonite, 78 parts of a 1:3 mixture of talc and clay and 2 parts of lignin sulfonate. The mixture was intimately blended and finely divided by means of an extruding granulator to obtain granules of 20–40 mesh, followed by drying at 40° – 50°C. The resulting granules were applied by scattering.

EXAMPLE 8

(Granules)

95 parts of clay particles of a size distribution of 0.2–2 mm were charged into a rotary mixer and a solution of 5 parts of compound No. 4 in an organic solvent was sprayed on to the particles being rotated, thereby wetting the particles uniformly. They were then dried at 40°–50°C to form coated granules. They were applied by scattering.

EXAMPLE 9

(Oil Preparation)

0.5 part of compound No. 6, 20 parts of "Velsicol AR-50" (high-boiling-point aromatic hydrocarbons) and 79.5 parts of "Deobase" (deodorized kerosene) were mixed by stirring to form an oil preparation. This was applied by spraying.

The pesticidal activity of the compounds of this invention is illustrated in and by the following test Examples, in which the active compounds are identified by

EXAMPLE 10

Test on preventive effect against blast of rice plants and on durability of effect.

Preparation of sample formulation

Solvent: 1 part by weight
Dispersing agent: 0.05 part by weight of sodium oleate
Other additive: 0.2 part by weight of gelatin
Water: 98.75 parts by weight A concentrated emulsifiable liquor obtained by adding the active compound, in an amount sufficient to obtain the prescribed concentration, to the above amount of the solvent was admixed to the above amount of water containing the above amounts of the dispersing agent and other additive.

Test procedure

Aquatic rice (jukkoku variety) was cultivated in pots of 12 cm diameter and the above-mentioned formulation containing the active compound at the prescribed concentration was applied to the rice in an amount of 50 ml per 4 pots.

Half of the treated aquatic rice was kept in a moisture room maintained at 25°C and a relative humidity of 100% for 2 days from the next day after the chemical spraying, and the remaining half was kept in the same room for 2 days from the 4th day after the chemical spraying. While in the said moisture room, the aquatic rice was infected twice with a suspension of spores of artificially cultured causative organisms of blast by spraying. From the results of the infection made the next day after the chemical spraying, the direct preventive effect can be evaluated, and from the results of the infection made the 4th day after the chemical spraying, the durability of the preventive effect can be appreciated.

Seven days after the infection, the disease attack ratio was expressed as the percentage ratio of the attach degree of the treated area to that of the untreated area. Thus, the disease attack ratio of 0 means that blast did not occur in the sample pot and the disease attack ratio of 100 means that the blast attack degree in the sample pot was the same as in the untreated area.

The phytotoxicity of the chemical was examined at the same time. The symbol "—" in this context means that the chemical did not adversely affect the growth of the rice plant.

Table 2

Results of tests on preventive effects against blast of rice plants and on the durability of the effects.

| Compound No. | Active compound concentration (ppm) | Disease attack degree (%) A* | Disease attack degree (%) B** | Phytotoxicity |
|---|---|---|---|---|
| 1 | 250 | 0 | 16 | — |
|   | 500 | 0 | 10 |   |
| 2 | 250 | 0 | 5 | — |
|   | 500 | 0 | 0 |   |
| 3 | 250 | 4 | 8 | — |
|   | 500 | 0 | 4 |   |
| 4 | 250 | 4 | 26 | — |
|   | 500 | 0 | 12 |   |
| 5 | 250 | 0 | 14 | — |
|   | 500 | 0 | 2 |   |
| 6 | 250 | 0 | 12 | — |
|   | 500 | 0 | 4 |   |
| Hinosan*** | 250 | 6 | 44 | — |
|   | 500 | 0 | 25 |   |
| Kitazin-P**** | 250 | 44 | 74 | — |
|   | 500 | 20 | 60 |   |
| Untreated control | — | 100 | 100 |   |

\* Infection 1 day after application of active compound
\*\* Infection 4 days after application of active compound
\*\*\* Commercially available compound of the formula

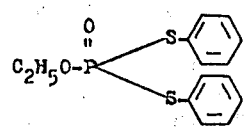

\*\*\*\* Commercially available compound of the formula

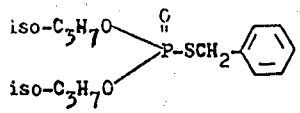

EXAMPLE 11

Test on effects against sheath blight:

Test procedure

Aquatic rice (Kin-maze variety)) was cultivated in pots of 12 cm diameter, and at the primary tiller stage a formulation containing the active compound at the prescribed concentration (which was prepared in the same manner as in Example A) was applied to the rice plants in an amount of 50 ml per 3 pots.

The next day, the stem of the sample rice plant was infected with causative organisms of sheath blight which had been cultured in a barley culture medium for 10 days and in which sclerotia had been formed. Then the sample was kept in an inoculation chamber maintained at 28° – 30°C and a relative humidity of more than 95% for 8 days. The degree of the disease was examined.

The damage degree was determined from the propagation of disease spots from the step root based on the following standard.

$$\text{Damage degree} = \frac{3N_3 + 2N_2 + N_1 + 0N_0}{3N} \times 100$$

wherein
N—the total of the stems examined
$N_0$—the number of the stems on which disease spots did not appear
$N_1$—the number of the stems in which disease spots extended to the first sheath
$N_2$—the number of the stems in which disease spots extended to the second sheath
$N_3$—the number of the stems in which disease spots extended to the third sheath.

The results are shown below.

Table 3

| | Results of tests on sheath blight | |
|---|---|---|
| Compound No. | Active compound concentration (ppm) | Damage degree |
| 1 | 500 | 25.0 |
| 2 | 500 | 16.6 |
| 6 | 500 | 24.8 |
| Untreated control | — | 57.6 |

It will be appreciated that the instant specification and examples are set forth by way of illustration and not limitation, and that various modifications and changes may be made without departing from the spirit and scope of the present invention.

What is claimed is:

1. A method of combating fungi and bacteria which comprises applying to the fungi, bacteria or a habitat thereof a fungicidally or bactericidally effective amount of a thiophosphoric acid ester of the formula

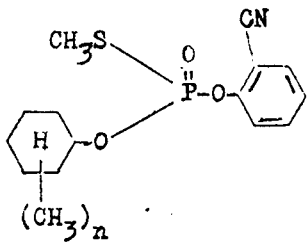

in which
n is 1 or 2.

2. The method according to claim 1 wherein said compound is O-(2-methylcyclohexyl)-S-methyl-O-(2-cyanophenyl)thiolphosphate of the formula

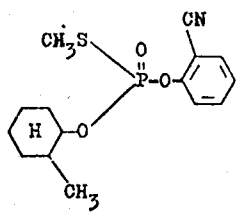

3. The method according to claim 1 wherein said compound is O-(3-methylcyclohexyl)-S-methyl-O-(2-cyanophenyl)thiolphosphate of the formula

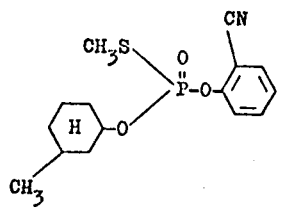

4. The method according to claim 1 wherein said compound is O-(4-methylcyclohexyl)-S-methyl-O-(2-cyanophenyl)thiolphosphate of the formula

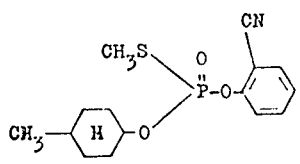

5. The method according to claim 1 wherein said compound is O-(2,5-dimethylcyclohexyl)-S-methyl-O-(2-cyanophenyl)thiolphosphate of the formula

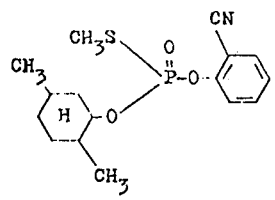

6. The method according to claim 1 wherein said compound is O-(3,5-dimethylcyclohexyl)-S-methyl-O-(2-cyanophenyl)thiolphosphate of the formula

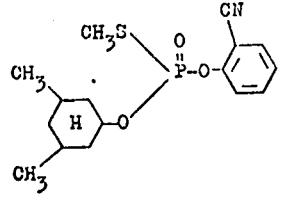

7. The method according to claim 1 wherein said compound is O-(3,4-dimethylcyclohexyl)-S-methyl-O-(2-cyanophenyl)thiolphosphate of the formula

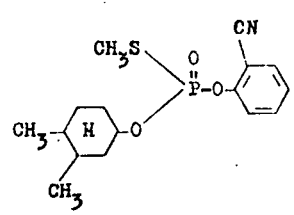

8. A fungicidal or bactericidal composition comprising a fungicidally or bactericidally effective amount of a thiophosphoric acid ester of the formula

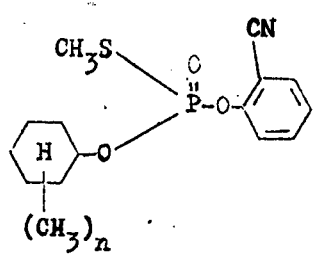

in which $n$ is 1 or 2, in admixture with a diluent.

9. The composition according to claim 8 in which said compound is:
O-(2-methylcyclohexyl)-S-methyl-O-(2-cyanophenyl)thiolphosphate,
O-(3-methylcyclohexyl)-S-methyl-O-(2-cyanophenyl)thiolphosphate,
O-(4-methylcyclohexyl)-S-methyl-O-(2-cyanophenyl)thiolphosphate,
O-(2,5-dimethycyclohexyl)-S-methyl-O-(2-cyanophenyl)thiolphosphate,
O-(3,5-dimethylcyclohexyl)-S-methyl-O-(2-cyanophenyl)thiolphosphate, or
O-(3,4-dimethylcyclohexyl)-S-methyl-O-(2-cyanophenyl)thiolphosphate.

* * * * *